United States Patent [19]

Nakao

[11] Patent Number: 5,699,263
[45] Date of Patent: Dec. 16, 1997

[54] TESTING DEVICE FOR WARNING THE POSSIBILITY OF ILLEGAL INTERCEPT OF IMAGE INFORMATION FROM AN ELECTROMAGNETIC EMISSION OF A COMPUTER SYSTEM

[75] Inventor: Tomoyuki Nakao, Kawasaki, Japan

[73] Assignee: Fujitsu Limited, Kawasaki, Japan

[21] Appl. No.: 509,088

[22] Filed: Aug. 1, 1995

[30] Foreign Application Priority Data

Aug. 25, 1994 [JP] Japan ................... 6-200454

[51] Int. Cl.⁶ ................................. G06F 17/00
[52] U.S. Cl. ................................. 364/481
[58] Field of Search ................ 364/514 R, 514 B, 364/481, 482, 483; 379/453, 451; 380/4, 6; 455/1

[56] References Cited

U.S. PATENT DOCUMENTS

5,165,098 11/1992 Hoivik .......................... 380/8
5,297,201 3/1994 Dunlavy ....................... 380/6
5,454,037 9/1995 Pacella ........................ 379/453

*Primary Examiner*—Ellis B. Ramirez
*Attorney, Agent, or Firm*—Armstrong, Westerman, Hattori, McLeland & Naughton

[57] ABSTRACT

A testing device includes a pickup for picking up an electromagnetic emission from a computer system, a detector for detecting the electromagnetic emission, a first connector adapted for connection to a computer for receiving a synchronization signal from the computer, a transmission path for transmitting the synchronization signal therethrough from the first end to a second end, and a second connector provided on the second end of the transmission path for connection to a display device, for supplying the synchronization signal and the output signal of the detection means to the display device.

11 Claims, 9 Drawing Sheets

TESTING DEVICE FOR WARNING THE POSSIBILITY OF ILLEGAL INTERCEPT OF IMAGE INFORMATION FROM AN ELECTROMAGNETIC EMISSION OF A COMPUTER SYSTEM

BACKGROUND OF THE INVENTION

The present invention generally relates to computers and more particularly to a testing device for warning the possibility of illegal intercept of image information from an electromagnetic emission of a computer system.

Generally, display devices of computer systems as well as circuits and cables connected thereto, cause a leak of electromagnetic emission. Such a leaking electromagnetic emission includes components carrying image signals indicative of the image information to be displayed on a display device of the system. Although such a leaking electromagnetic emission is extremely feeble, it is still possible to intercept the leaking electromagnetic emission by a high sensitivity antenna and a high sensitivity receiver, and reconstruct the image information therefrom.

In the side of the user of a computer system, on the other hand, there has been no way of checking if the image information of the system is intercepted by another party. In order to do such a checking, it has been necessary to contract with a party or person who has a skill of intercepting such image information from an electromagnetic emission, while such an approach is of course not acceptable.

Generally, personal computers emit electromagnetic emission that is amplitude modulated by the image information to be displayed. However, the leaking electromagnetic emission does not include synchronization signals that are used commonly in the television broadcast for synchronizing the line-sequential image signal with a scanning achieved in a display device.

Thus, in order to acquire image information from a leaking electromagnetic emission, it is necessary to add a synchronization signal thereto externally.

Figure 1:
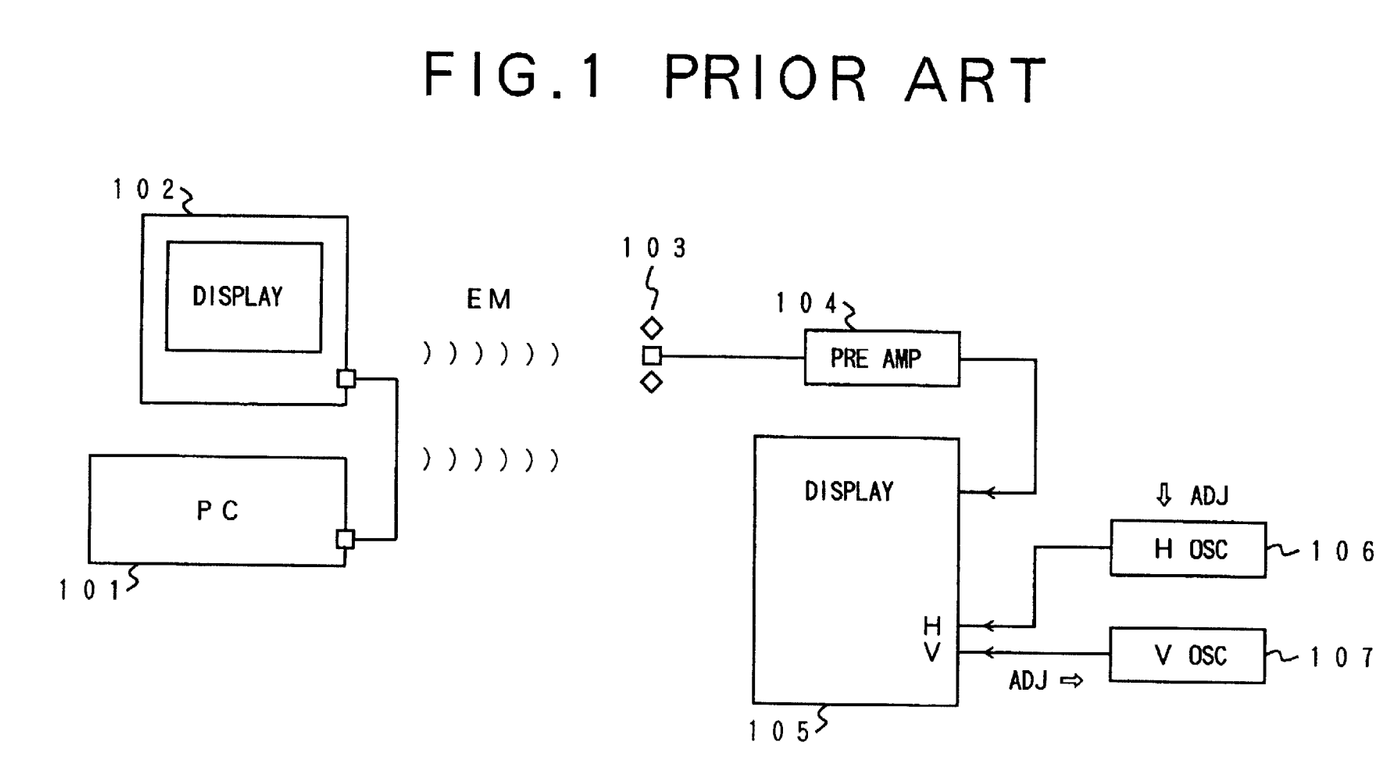
FIG. 1 is a diagram showing the construction of a conventional device for intercepting image information from a computer.

FIG. 1 shows the construction of a conventional image intercepting system that is used for intercepting image information from a leaking electromagnetic emission, together with a personal computer system of which image information is to be intercepted.

Referring to FIG. 1, the personal computer system includes a computer 101 and a display device 102 as usual, while the intercepting system includes an antenna 103 for picking up the leaking electromagnetic emission and a preamplifier 104 for amplifying and detecting the image signal included in the electromagnetic emission. Further, the intercepting device includes a display device 105 that displays the detected image signal in the form of visual image, while the display device 105 cooperates with a horizontal synchronizing oscillator 106 and a vertical synchronizing oscillator 107 respectively supplying a horizontal synchronization signal and a vertical synchronization signal to the display device 105.

In operation, the horizontal and vertical synchronizing oscillators 106 and 107 are adjusted such that the phase of the horizontal and vertical synchronization signals is exactly coincident to those used in the computer 101. Thereby, the scanning occurs in the display device 105 exactly in synchronization with the display device 102, and the image that is displayed on a screen of the display device 102, is restored also on a monitor screen of the display device 105.

In the intercepting system of FIG. 1, it is therefore necessary to maintain the frequency and phase of the synchronization signals produced by the oscillators 106 and 107 to be exactly identical with those used in the personal computer as already noted, while such an exact synchronization is difficult to maintain for prolonged duration, particularly with respect to the phase. Thus, the restored image on the display device 105 generally decays with time, unless the phase of the synchronizing oscillators are adjusted frequently.

SUMMARY OF THE INVENTION

Accordingly, it is a general object of the present invention to provide a novel and useful testing device for warning the possibility of illegal intercept of image information from an electromagnetic emission of a computer system.

Another and more specific object of the present invention is to provide a testing device of the art set forth above that has a simple construction and is easy to use.

Another object of the present invention is to provide a testing device for warning the possibility of illegal intercept of image information from an electromagnetic emission of a computer system, comprising:

reception means for picking up an electromagnetic emission from a computer system;

detection means for detecting said electromagnetic emission and producing an output signal indicative of an image intercepted from said computer system;

first connector means adapted for connection to a computer that forms a part of said computer system, for receiving a synchronization signal from said computer;

transmission means having a first end connected to said first connector means and a second, opposite end, said transmission means transmitting said synchronization signal from said first end to said second end, said transmission means further transmitting said output signal of said detection means to said second end; and second connector means provided on said second end of said transmission means, said second connector being adapted for connection to a display device that form a part of said computer system, for supplying said synchronization signal and said output signal of said detection means to said display device.

According to the present invention, it is possible to monitor, by using the display device of the system, whether or not there is a possibility of intercepting the image information of the system from the electromagnetic emission that leaks from the system. When the image reproduced by the testing device and displayed on the display device is readable, this indicates that there is a possibility that the image information of the system is intercepted by another party. As the testing device of the present invention does not use a separate display device or any synchronizing signal oscillator provided separately to the system, the construction thereof is substantially simplified and the cost of the device is reduced correspondingly. As the testing device uses the synchronization signal of the system itself for the synchronization of the intercepted image, there is no need anymore to adjust the synchronization of the intercepted image. Thereby, the operation of the testing device becomes substantially facilitated.

Other objects and further features of the present invention will become apparent from the following detailed description when read in conjunction with the attached drawings.

DETAILED DESCRIPTION OF THE PREFERRED EMBODIMENTS

Figure 2A:
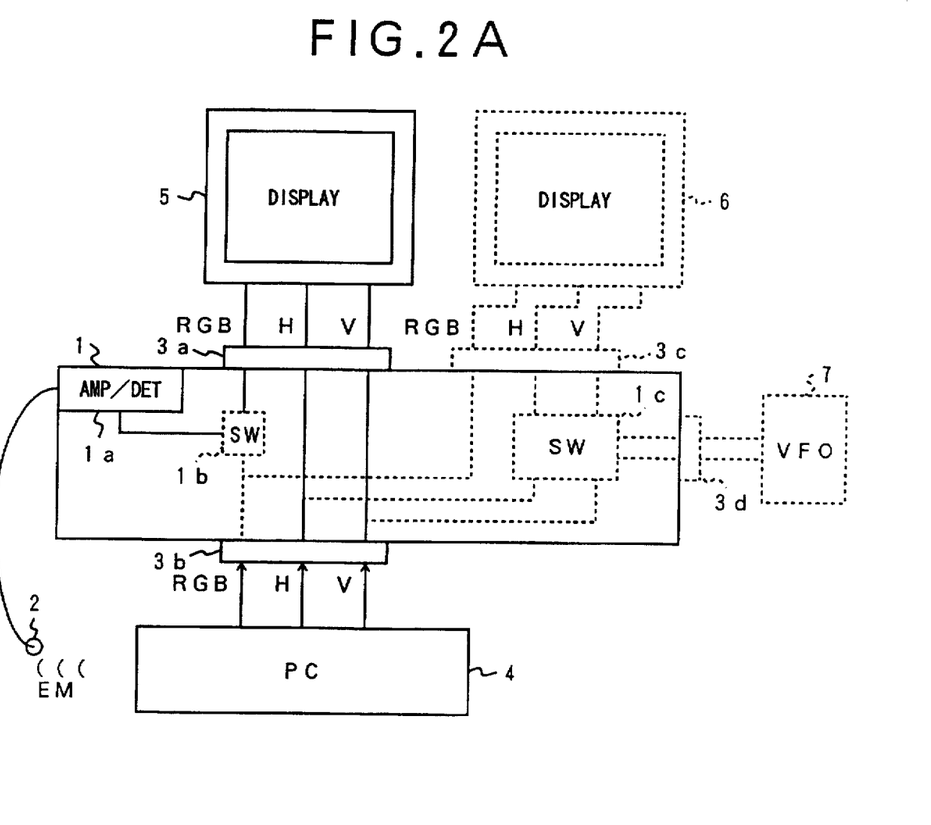
FIGS. 2A and 2B are diagrams showing the principle of the present invention.
Figure 2B:
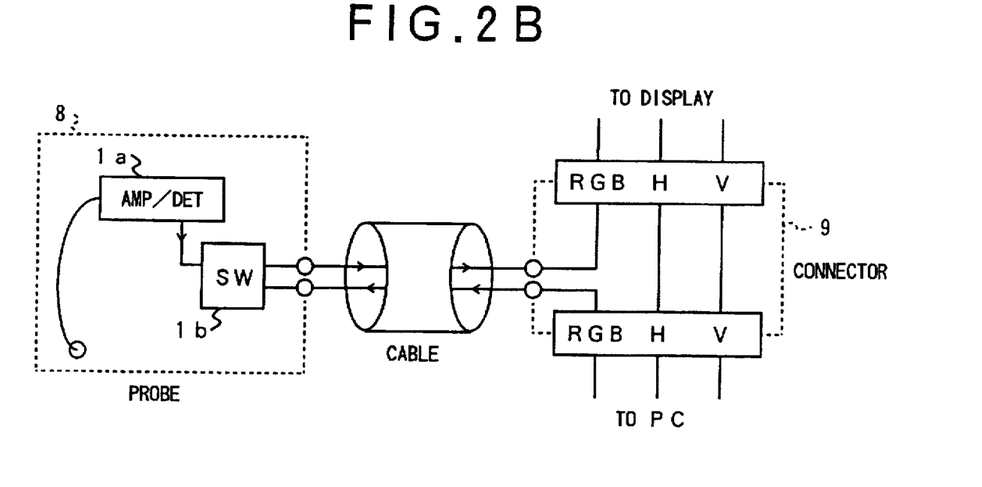

FIGS. 2A and 2B show the principle of the testing device of the present invention for warning the possibility of illegal intercept of image information from an electromagnetic emission of a system, wherein FIG. 2A shows the construction of overall system including a testing device 1 and a computer system that is subjected to testing by the testing device 1, while FIG. 2B shows the construction of the testing device 1 itself.

Referring to FIG. 2A, the testing device 1 includes a pickup coil 2 acting as an antenna for picking up an electromagnetic emission from a computer system that includes a computer 4 and a display device 5, wherein the testing device further includes a detector 1a for amplifying and detecting the electromagnetic emission that has been picked up by the pickup coil 2. The detector 1a thereby produces an output signal indicative of an image intercepted from the computer system.

The testing device 1 further includes a first connector 3b adapted for connection to the computer 4 for receiving horizontal and vertical synchronization signals H and V therefrom, and a transmission path having a first end connected to the first connector 3b and a second, opposite end, wherein the transmission path transmits the synchronization signals H and V from the first end to the second end. In addition, the transmission path further transmits the output signal of the detector 1a to the second end.

At the second end of the transmission path, there is provided a second connector 3a adapted for connection to the display device 5 of the system, wherein the second connector 3a supplies the synchronization signals H and V from the first end as well as the output signal of the detector 1a, to the display device 5.

FIG. 2B shows the testing device 1 alone. Referring to FIG. 2B, the testing device is formed of a probe unit 8 that includes the pickup coil 2 and the detector 1a, and a connector unit 9 that includes the connectors 3a and 3b, wherein the probe unit 8 and the connector unit 9 are connected with each other by a cable. In other words, the testing device 1 does not have a display device devoted for the purpose of monitoring of the intercepted image.

In operation, the horizontal and vertical synchronization signals H and V of the computer 4 are supplied, via the testing device 1, to the display device 5 of the computer system together with the image signal recovered from the leaking electromagnetic emission by the foregoing pickup coil 2 and the detector 1a. Thereby, when the field strength of the electromagnetic emission is strong enough, one can reconstruct the image on the display 5 of the computer system based upon the leaking electromagnetic emission. When the image thus reproduced on the display device 5 is not legible, it indicates the that the leaking electromagnetic emission is so weak that there is no substantial risk of the image information being intercepted by another party. When, on the other hand, the reproduced image on the display device 5 is legible, this indicates that there is a substantial risk of the image information being intercepted and one should take an action to reduce the strength of the electromagnetic emission leaking from the system.

As indicated in FIG. 2B, the testing device of the present invention has a very simple construction and is easily implemented in an existing computer system without adding a separate display device, without any need for adjustment of the synchronization signals. Further, because of the construction shown in FIG. 2B indicating that the testing device 1 is actually formed of the probe unit 8 and the connector unit 9 connected with each other by a cable, the testing device can be adapted easily to the computer system to be tested by simply replacing the connector unit 9.

In the construction of FIG. 2A, one may provide a switch 1b in the path of the output signal of the detector 1a to the connector 3a. In this case, the connector 3b is adapted for connection also to the RGB output terminal of the computer 4 for receiving an image signal therefrom in the form of RGB image signals. The image signals thus received are then forwarded to the switch 1b that selects either of the output signal of the detector 1a and the foregoing image signals of the computer 4, and supplies the selected image signal to the display device 5 via the connector 3a. Thereby, one can easily compare the image information to be displayed on the display device 5 by the computer 4 and the image information recovered from the leaking electromagnetic emission, by activating the switch 1b.

Alternatively, one may provide a separate display device 6 connected in parallel, with respect to the display device 5, to the connector 3b via a connector 3c, such that the RGB image signals as well as the horizontal and vertical synchronization signals H and V of the computer 4, are supplied to the display device 6 via the connectors 3b and 3c. By constructing the system as such, it is possible to check if there is a leak of electromagnetic emission from the display device 6 rather than the computer 1 by providing the pickup coil 2 in the vicinity of the display device 6. Further, such a construction allows simultaneous display of the image information supplied from the computer 4 for display and the image information recovered from the leaking electromagnetic emission.

Further, one may monitor for the leak of electromagnetic emission from a system that uses different horizontal and vertical synchronization signals, by providing a variable frequency oscillator 7 that supplies arbitrarily set horizontal and vertical synchronization signals to the display device 6 via a connector 3d and a switch 1c.

Hereinafter, the present invention will be described with reference to the preferred embodiments.

Figure 3A:
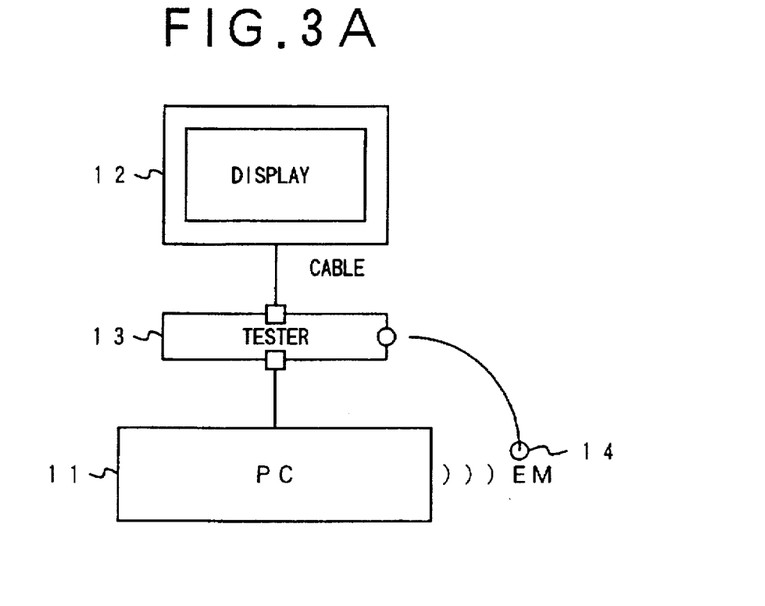
FIGS. 3A and 3B are diagrams showing the construction of a testing device according to a first embodiment of the present invention.
Figure 3B:
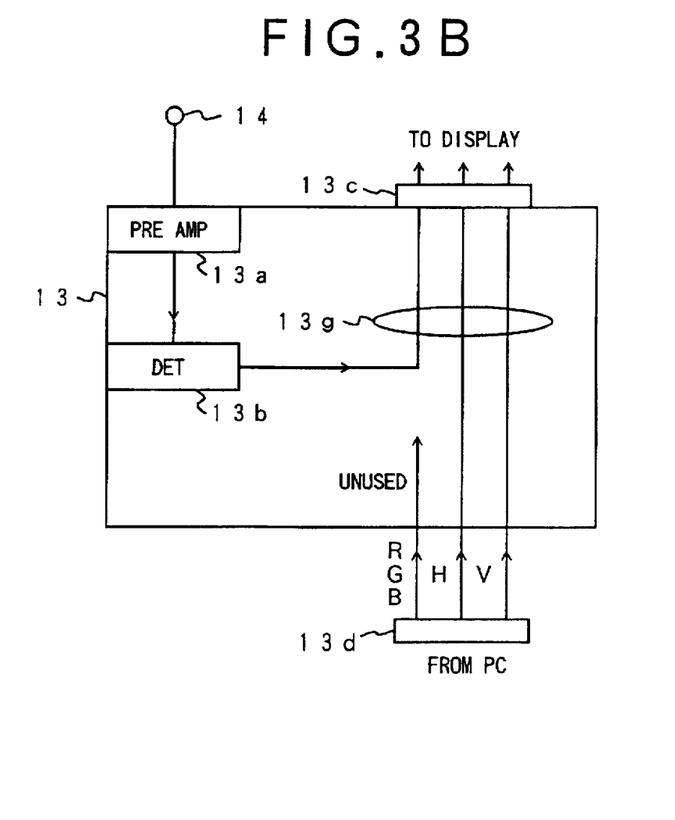

FIGS. 3A and 3B show a first embodiment of the present invention, wherein FIG. 3A shows the interconnection of a testing device 13 of the present invention with a computer system while FIG. 3B shows the construction of the testing device 13 itself.

Referring to FIG. 3A, the computer system includes a personal computer 11 and a display device 12 as usual, wherein the personal computer 11 produces an image signal to be displayed and supplies the same to the display device 12 via a display cable.

In order to monitor the leak of the electromagnetic emission from any part of the computer system, the testing device 13 is connected between the computer 11 and the display device 12 in such a manner that the testing device 13 is interposed in a display cable extending from the computer 11 to the display device 12.

Referring to FIG. 3B, the testing device 1 includes a pickup coil 14 for picking up the leaking electromagnetic emission of the system and a preamplifier 13a that amplifies the electromagnetic emission picked up by the coil 14. The preamplifier 13a thereby supplies an output signal indicative of the electromagnetic emission picked up by the coil 14 to a detector 13b for detection. The detector 13b in turn produces an output signal indicative of an image signal contained in the electromagnetic emission as a result of the detection, and supplies the same to a connector 13c that is provided at an end of a cable 13g.

It should be noted that the cable 13g carries, at the other and thereof, another connector 13d that is adapted for connection to the personal computer 11. More specifically, the connector 13d is adapted for receiving the horizontal scanning signal H and the vertical scanning signal V from the computer 11, and the scanning signals H and V thus supplied to the cable 13g is transmitted to the foregoing connector 13c. The connector 13c, on the other hand, is adapted for connection to the display device 12, and supplies the foregoing signals H and V to the display device 12 as the horizontal and vertical synchronization signals respectively. Further, the connector 13c supplies the output of the amplifier 13b to the display device 12 as the image signal to be displayed. On the other hand, the RGB signal from the computer 11 is interrupted at the connector 13d and is not transmitted to the connector 13c in the present embodiment.

In operation, the testing device 13 is connected between the computer 11 and the display device 12 as explained in FIG. 3A, and the pickup coil 14 is disposed in the vicinity of the system to be tested. Further, the pre-amplifier 13a and the detector 13b are activated for detection of the leaking electromagnetic field that the pickup coil 14 has picked up.

When there is a substantial electromagnetic emission from the system, the image signal contained in the electromagnetic emission is detected with such a signal-to-noise ratio that enables a restoration of the original image information to be displayed on the display device 12.

In the testing device 13, the image signal thus recovered from the electromagnetic emission is displayed on the monitor screen of the display device 12 of the system for visual checking, if the image information thus restored is legible at all or not. For this purpose, it is necessary to display the image signal produced by the detector 13b on the display 12 with a proper horizontal as well as vertical synchronization.

As the image signal produced by the detector 13b does not contain such a synchronization signal, the testing device 13 uses the horizontal and vertical synchronization signals H and V produced by the computer 11 for this purpose. Thus, the signals H and V are supplied, from the computer 11 to the connector 13d, from the connector 13d to the connector 13c, and from the connector 13c to the display device 12. As the synchronization signals H and V, produced by the computer 11 for the purpose of displaying the information, is used for synchronizing the recovered image signal, a proper scanning of the recovered image signal, and hence a proper restoration of the original image information, is guaranteed, without any need for adjusting the synchronization.

As already noted, when one obtains a legible image information on the display device 12 from the electromagnetic emission thus picked up, this indicates that there is a substantial possibility or even a risk that the image information is intercepted by another party. Based upon the restored image information, therefore, one can improve the electromagnetic insulation of the system. When there is no successful restoration of image information, on the other hand, this indicates the system is safe against the illegal intercept of the image information and that there is no need for further expenditure for improved electromagnetic insulation. Thereby, one can save the cost that otherwise would be speeded unnecessarily.

Next, a second embodiment of the present invention will be described with reference to FIG. 4, wherein those parts described previously with reference to the first embodiment are designated by the same reference numerals and the description thereof will be omitted.

Figure 4:
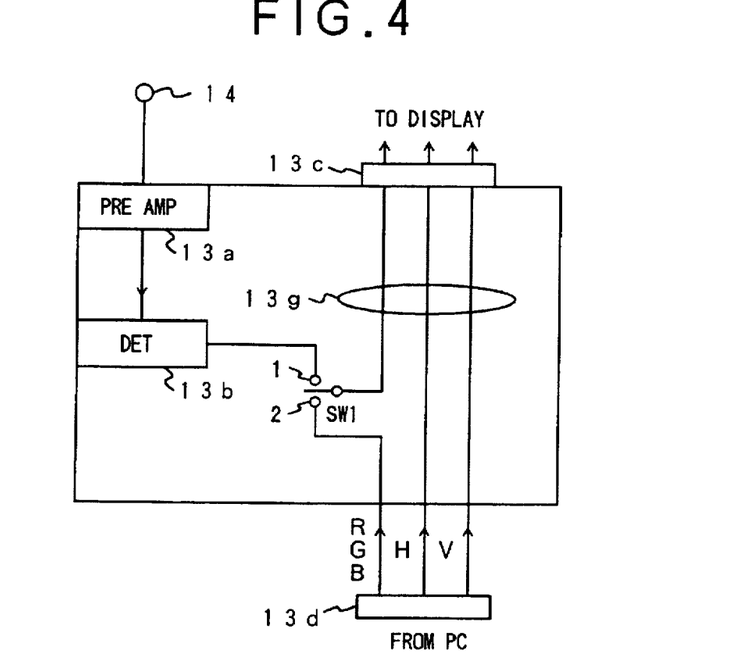
FIG. 4 is a diagram showing the construction of a testing device according to a second embodiment of the present invention.

Referring to FIG. 4, the testing device includes a switch SW1 provided on the cable 13g, such that the switch SW1 selects one of the image signal supplied to a contact "1" from the detector 13b and the image signal supplied from the computer 11 to a contact "2" via the connector 13d.

In operation, the switch SW1 is set to the side of the contact "1" for monitoring the image information intercepted from the electromagnetic emission of the system, similarly as before. On the other hand, when the switch SW1 is set to the side of the contact "2," on the other hand, the RGB image signal of the computer 11 is supplied to the display device 12 via the cable 11e, together with the synchronization signals H and V. Thereby, the original image information is displayed on the display device 12 similarly to the case where no testing device is used.

Thus, by simply activating the switch SW1 between the contact "1" and the contact "2," it becomes possible to switch the image information displayed on the display device 12 from the intercepted image to the original image and from the original image to the intercepted image. Thereby, one can easily evaluate the risk of the image information being intercepted by comparing these two images.

Figure 5A:
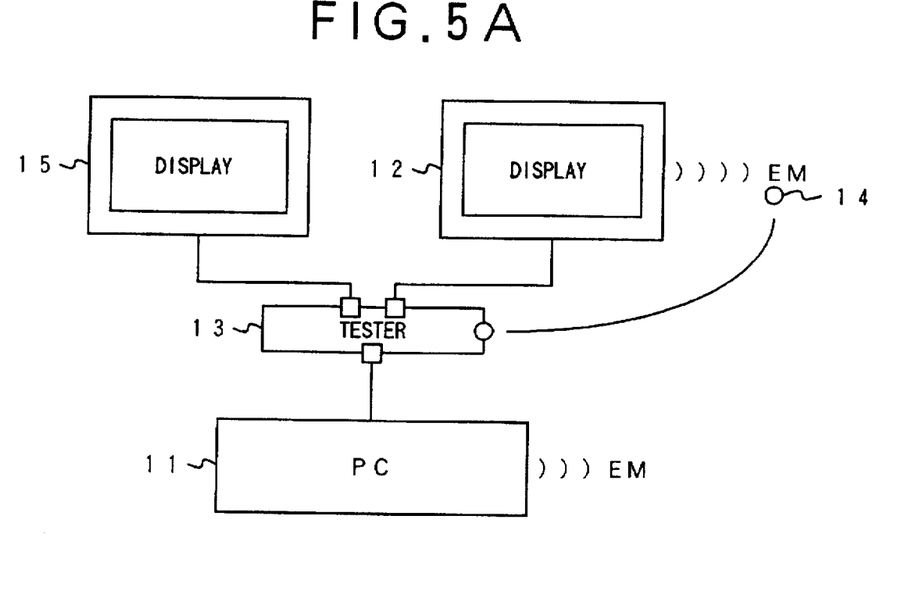
FIGS. 5A and 5B are diagrams showing the construction of a testing device according to a third embodiment of the present invention.
Figure 5B:
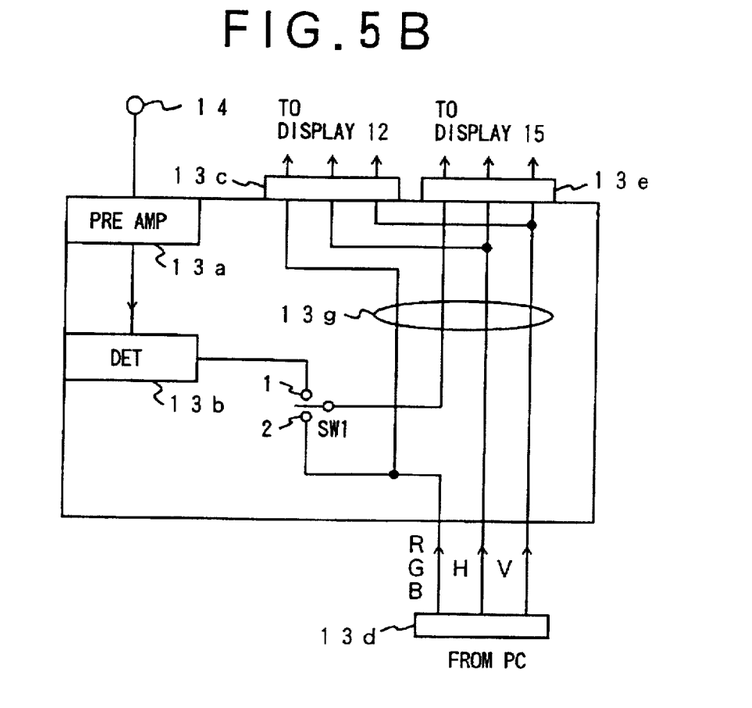

Next, a third embodiment of the present invention will be described with reference to FIGS. 5A and 5B, wherein FIG. 5A shows the overall construction of the system including the computer 11 and the display device 12, while FIG. 5B shows the construction of the testing device itself. In FIGS. 5A and 5B, those parts described previously will be designated by the same reference numerals and the description thereof will be omitted.

Referring to FIG. 5A, the present embodiment uses another display device 15 used for the testing purpose for displaying the intercepted image information, while the display device 12 is used explicitly for displaying the original image information supplied from the computer 11.

Thus, referring to FIG. 5B, it will be noted that the RGB image signal supplied from the computer 11 to the connector 13d is forwarded directly to the connector 13c and further to the display device 12 connected thereto, together with the synchronization signals H and V. On the other hand, the same image signal is supplied to the contact "2" of the switch SW1 similarly to the previous embodiment. Thus, the intercepted image signal is supplied also to the contact "1" of the switch SW1 from the detector 13b, and the switch SW1 selects one of the signals on the contact "1" and the contact "2" and supplies the same to the connector 13e and further to the display device 15, together with the synchronization signals H and V.

In operation, the display device 12 displays the original image information that the computer 11 has produced for display, while the display device 15 displays, when the switch SW1 is set to select the contact "1," the image information that has been intercepted from the electromagnetic emission of the computer 11. When the switch SW1 is set to select the contact "2" on the other hand, the same original image information as that on the display device 12, is displayed also on the display device 15.

In the construction of the present embodiment, it is possible to check the electromagnetic emission from the display device 12 by disposing the pickup coil 14 in the vicinity of the display device 12 while monitoring for the intercepted image information on the display device 15. Further, such a construction facilitates the testing procedure by representing the original image information and the intercepted image information simultaneously.

Figure 6A:
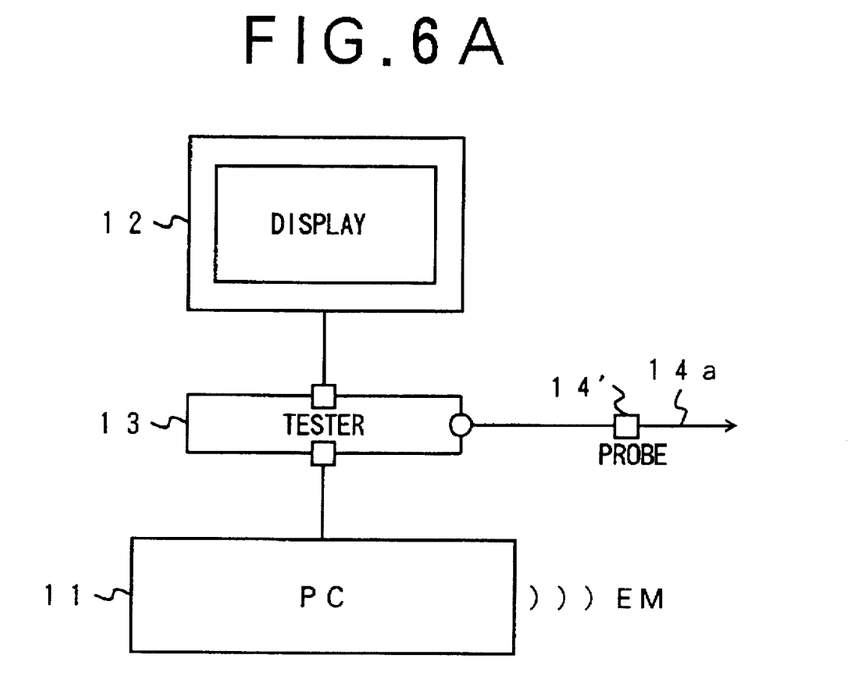
FIGS. 6A and 6B are diagrams showing the construction of a testing device according to a fourth embodiment of the present invention.
Figure 6B:
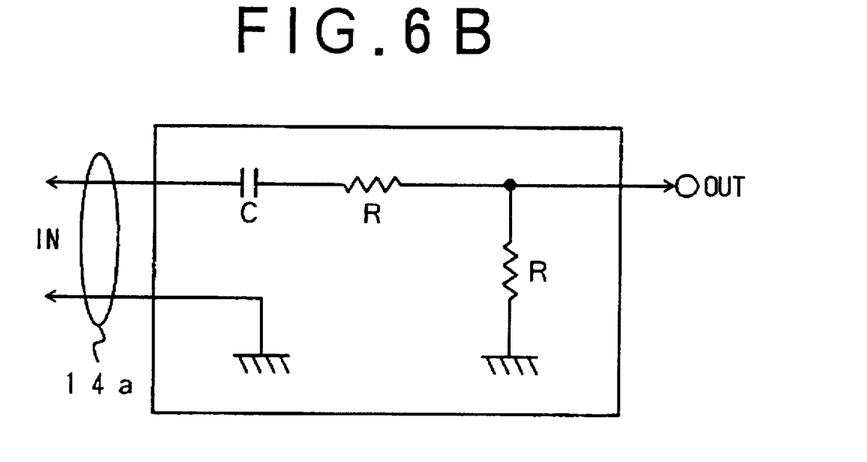

Next, a fourth embodiment of the present invention will be described with reference to FIGS. 6A and 6B, wherein FIG. 6A shows the overall construction of the system of the testing device 13 that uses a probe circuit 14' in place of the pickup coil 14 for picking up the electromagnetic emission. FIG. 6B shows, on the other hand, the construction of the probe circuit 14' that is designed for picking up the electromagnetic emission by making a contact with a part of the computer 11. In FIGS. 6A and 6B, those parts corresponding to the parts described previously are designated by the same reference numerals and the description thereof will be omitted.

As indicated in FIG. 6B, the probe circuit 14' includes a probe electrode 14a adapted for contact with a circuit in the computer 11 or display 12 or any other part of the computer system, wherein the a high-pass filter circuit that includes a capacitor C and resistors R is connected to the probe electrode 14a for cutting out the low frequency components and d.c. component from the electromagnetic emission picked up by the probe electrode 14a.

In operation, the probe electrode 14a of the probe circuit 14' is contacted to various parts of the computer system, for picking up the electromagnetic emission. Thereby, it is possible to point out the part that is responsible for the leak of the electromagnetic emission easily. Once the circuit that causes the problem is identified, one can easily and quickly fix the problem. Thereby, the cost for implementing necessary modification of the computer system is minimized. It should be noted that the pickup circuit 14' of FIG. 6B is applicable to any of the embodiments described heretofore as well as to those to be described heretofore.

Next, a fifth embodiment of the present invention will be described with reference to FIG. 7.

Figure 7:
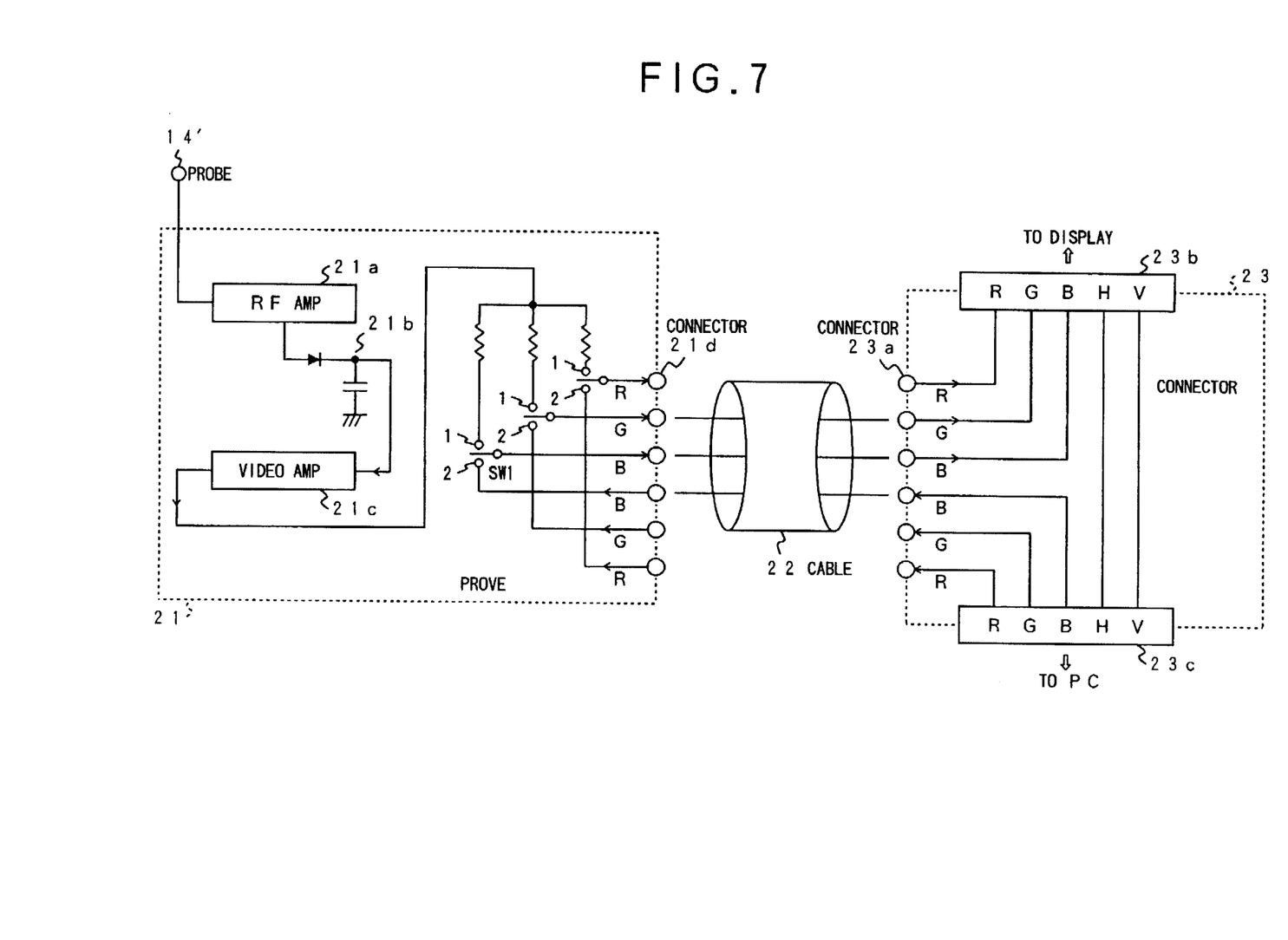
FIG. 7 is a diagram showing the construction of a testing device according to a fifth embodiment of the present invention.

Referring to FIG. 7, the testing device is formed of a probe unit 21 connected to the probe circuit 14' and a connector unit 23 connected to the probe unit 21 by a cable 22, wherein the probe unit 21 includes an RF amplifier 21a that receives and amplifies the electromagnetic emission of a computer picked up by the probe circuit 14'. Further, the probe unit 21 includes a detection circuit 21b formed of a diode and a smoothing capacitor for detecting the electromagnetic emission supplied from the RF amplifier 21a after amplification, and a video amplifier 21c for amplifying an image signal recovered from the electromagnetic emission as a result of detection of the electromagnetic emission in the detector 21b.

It should be noted that the video amplifier 21c supplies the reproduced image signal to the switch SW1, wherein the switch SW1 includes three contacts "1" for a first side and another three contacts "2" for a second side respectively in correspondence to the red (R), green (G) and blue (B) image signals. Thus, the same image signal of the video amplifier 21c is supplied to each of the three contacts "1" as R, G and B signals. It should be noted that the switch SW1 is actually formed of three switches actuated simultaneously.

On the other hand, the three image signals R, G and B from a computer, such as the computer 11 to be tested, are supplied to the respective contacts "2" of the switch SW1 via a connector 23c that is adapted for connection to the computer as well as via the cable 22 as indicated in FIG. 7. Thus, the switch SW1 selects one of the signal supplied to the contact "1" and the signal supplied to the contact "2" for each of the R, G and B signals, and the selected signals are supplied to a connector 23b that is adapted for connection to a display device of the computer system such as the display device 12, via the cable 22, and further from the connector 23b to the display device. In the switch SW1, it should be noted that the setting of the switch SW1 to the first state causes the selection of the all three signals supplied to the three contacts designated by "1" simultaneously, while the setting of the switch SW1 to the second state causes the simultaneous selection of all the signals that are supplied to the three contacts designated by "2."

In the construction of FIG. 7, it should further be noted that the horizontal and vertical synchronization signals H and V are supplied directly from the connector 23c to the connector 23b.

In addition, it should be noted, in the construction of FIG. 7, that the cable 22 is connected to the probe unit 21 detachably at an interfacing connector 21d. Similarly, the cable 22 is connected detachably to the connector unit 23 at another interfacing connector 23a.

In operation, the testing is conducted by first setting the switch SW1 to the first state such that the image signal recovered from the electromagnetic emission is supplied to the display device of the computer system. Next, the switch SW1 is set to the second state such that the original RGB image signals are supplied to the display device. Thus, by comparing the reproduced image information on the display device, one can easily judge if there is a substantial risk that the image information is intercepted illegally by another party.

Similarly as before, the present embodiment uses the synchronization signals H and V for controlling the scanning both in reproducing the intercepted image information and the original image information, and there is no need for adjusting the synchronization signals. Further, the testing device of the present embodiment is applicable to various types of computers by simply replacing the connector unit 23 at the connector 23a or at the connector 21d.

Next, a sixth embodiment of the present invention will be described with reference to FIGS. 8 and 9, wherein those parts described previously are designated by the same reference numerals and the description thereof will be omitted.

Figure 8:
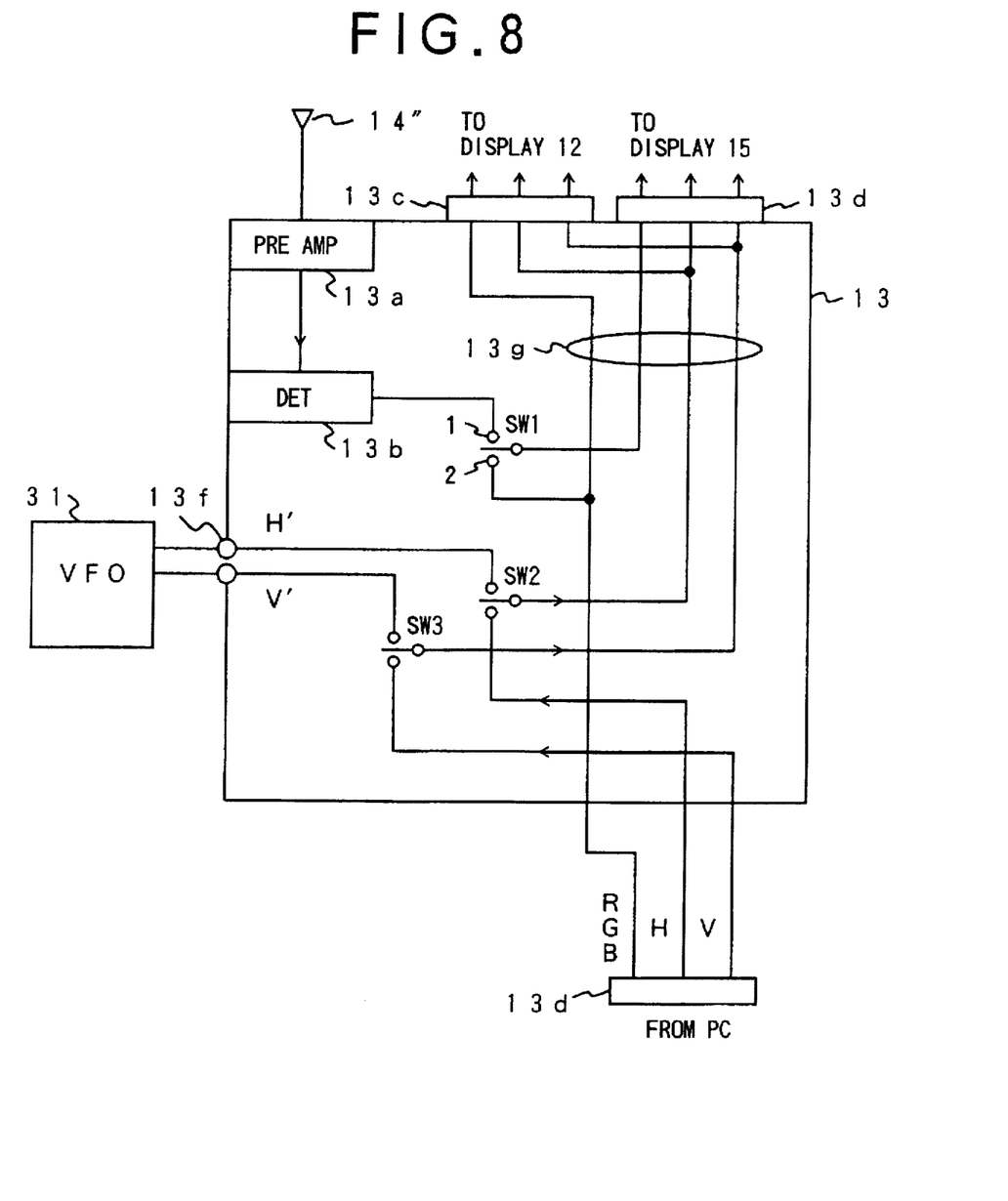
FIGS. 8 and 9 are diagrams showing the construction of a testing device according to a sixth embodiment of the present invention.

Referring to FIG. 8 showing the construction of the testing device of the present embodiment, it will be noted that the testing device 13 includes a variable frequency oscillator 31 connected thereto at a connector 13f, wherein the variable frequency oscillator 13f produces outputs signals H' and V' that are supplied, via switches SW2 and SW3 respectively, to the connector 13c as well as to the connector 13d.

More specifically, the switches SW2 and SW3 are set to a first state when one wishes to supply the signals H' and V' to the connectors 13c and 13d. Thereby, the signals H' and V' thus supplied are further forwarded, from the connectors 13c and 13d to the display devices 12 and 15, as horizontal and vertical synchronization signals. In other words, the signals H' and V' are used in the display devices 12 and 15 for controlling the horizontal and vertical synchronization in place of the signals H and V produced by the computer. When the switches SW2 and SW3 are set to a second, opposite state, the foregoing signals H and V of the computer are supplied to the connector 13c and further to the connector 13d as the horizontal and vertical synchronization signals. It should be noted further that testing device 13 of the present embodiment uses an antenna 14" as a pickup means for picking up the electromagnetic emission of a computer system. Further, it should be noted that the three image signals R, G and B are designated collectively in FIG. 8 by a common image signal.

In operation, the testing device 13 operates similarly as before as long as the switches SW2 and SW3 are set to the second state. Thereby, the horizontal and vertical synchronization signals of the computer to be tested are supplied to the monitor device of the computer system to be tested.

When the switches SW2 and SW3 are set to the first state, on the other hand, the signals H' and V' of the variable frequency oscillator 31 are used for the synchronization control of the display device 12 as well as the display device 15. Thus, it is possible for the testing device 13 of the present embodiment to monitor the electromagnetic emission leakage of other computers that are not connected thereto, as indicated in FIG. 9.

Figure 9:
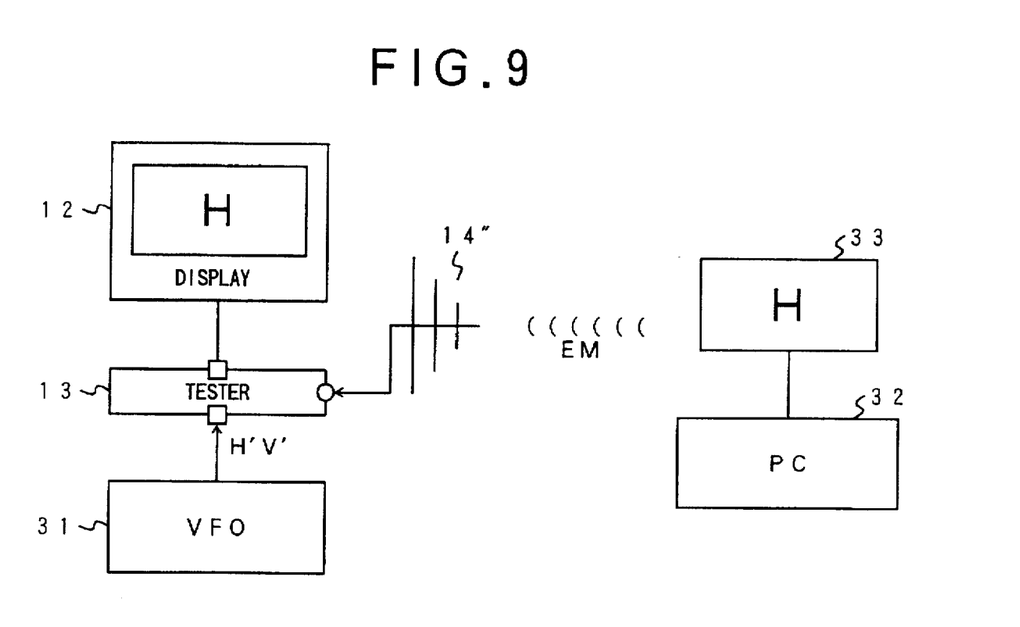

Referring to FIG. 9, it will be noted that the antenna 14" picks up the electromagnetic emission of a computer system that includes a computer 32 and a display device 33, wherein the image information contained in the electromagnetic emission thus picked up is restored by supplying the horizontal and vertical synchronization signals H' and V' from the variable frequency oscillator 31 with a proper frequency and phase. Thus, the testing device 13 of the present embodiment can be used also for an interception device for intercepting image information of a computer not connected thereto.

Figure 10:
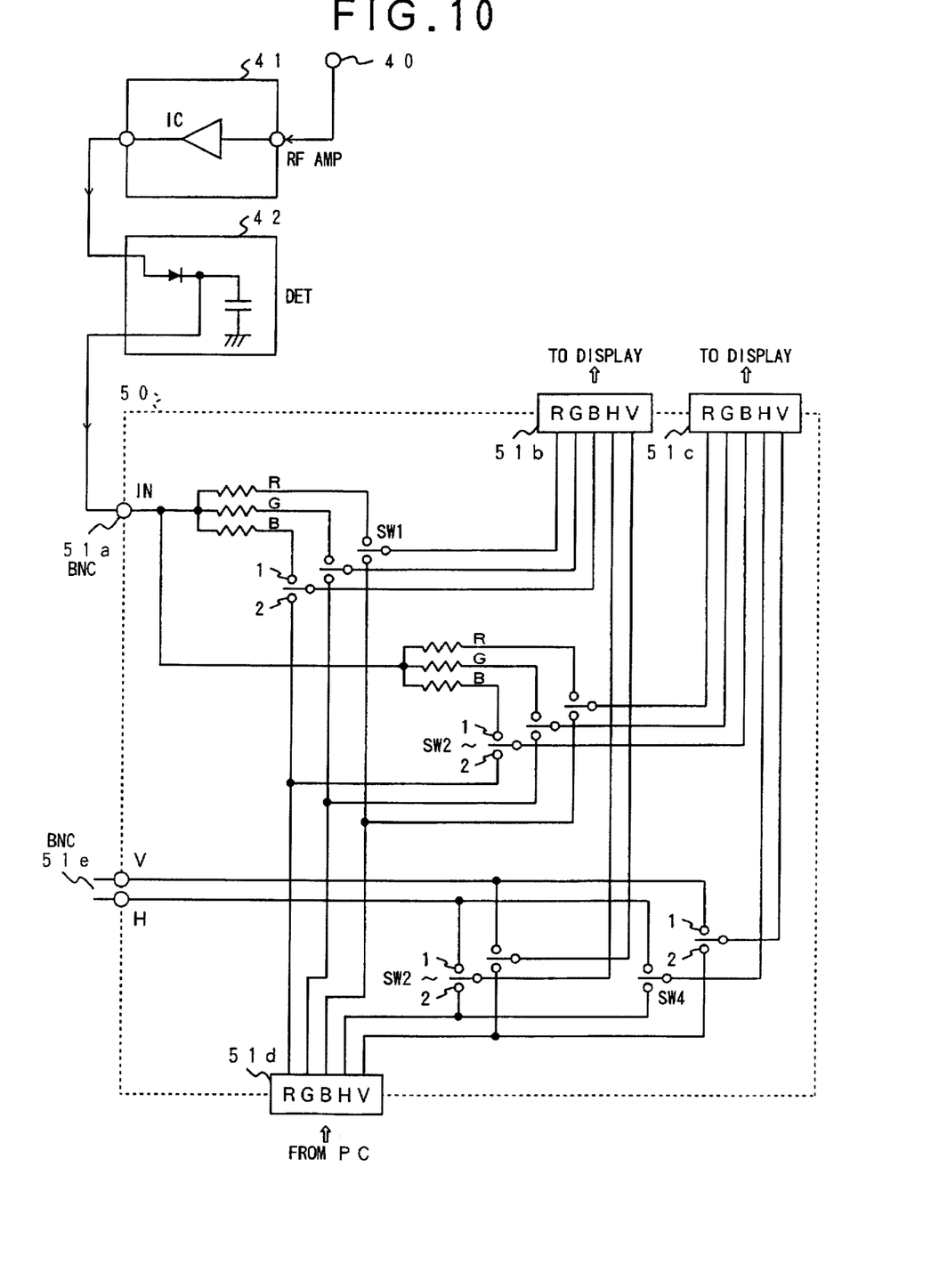
FIG. 10 is a diagram showing the construction of a testing device according to another embodiment of the present invention.

FIG. 10 shows the construction of a further embodiment of the testing device of the present invention.

Referring to FIG. 10, the testing device includes an antenna 40 corresponding to any of the pickup coil 14, the probe 14', or the antenna 14" described before, and supplies the picked up electromagnetic emission to an RF amplifier 41. After amplification in the RF amplifier 41, the electromagnetic emission is forwarded to a detection circuit 42 for detection, and an image signal is recovered from the electromagnetic emission thus picked up by the antenna 40 as a result of the detection.

The output image signal of the detector 42 is then supplied to a connector switching unit 50 at a connector 51a via a cable such as a BN cable, wherein the image signal thus supplied is distributed to the three contacts "1" of the switch SW1 as image signals R, G and B. It should be noted that the contacts "1" form the switch SW1 together with three other contacts "2." Further, the image signals R, G and B produced by a computer and supplied to the switching unit 50 at the connector 51d, are forwarded to the respective contacts "2" of the switch SW1.

Thus, when the switch SW1 is set to select the side of the contacts "1," the intercepted image signal detected by the detector 42 and supplied to the connector 51a, is supplied further to the connector 51b via the switch SW1 in the form of the image signals R, G and B. When, on the other hand, the switch SW1 is set to the side of the contacts "2," the original image signals R, G and B produced by the computer and supplied to the connector 51d, are supplied to the connector 51b after passing through the switch SW1. Similarly, another switch, SW2, selects one of the intercepted image signal at the connector 51a and the image signals R, G and B supplied to the connector 51d from the computer, and supplies the same to the connector 51c.

Further, there are provided switches SW3 and SW4 for selecting one of the synchronization signals H and V supplied to the connector 51e and to the connector 51d, to the connector 51b and to the connector 51c, respectively. Thus, when the switch SW3 is set to the side of the contact "1," the external synchronization signals H and V are supplied, from the connector 51e, to the connector 51b. When the switch SW3 is set to the side of the contact "2," on the other hand, the synchronization signals H and V at the connector 51d are supplied to the connector 51b. Similarly, when the switch SW4 is set to the side of the contact "1," the external synchronization signals H and V are supplied, from the connector 51e, to the connector 51c. When the switch SW4 is set to the side of the contact "2," on the other hand, the synchronization signals H and V at the connector 51d are supplied to the connector 51c. It should be noted that each of the switches SW3 and SW4 is actually formed two similar switches respectively switching the synchronization signals H and V and actuated simultaneously. Similarly, each of the switches SW1 and SW2 actually includes three switches actuated simultaneously and respectively switching the image signals R, G and B.

It should be noted that the construction of FIG. 10 is applicable to implement any of the embodiments described heretofore. Thus, by setting the switch SW1 to the side of the contact "1," the intercepted image information is displayed on a monitor display device connected to the connector 51b. Thereby, one may supply the horizontal and vertical synchronization signals H and V either from the computer by setting the switch SW3 to the side of the contact "2" or from an external variable frequency oscillator by setting the switch SW3 to the side of the contact "1." Further, by setting the switch SW2 to the side of the contact "2," it is possible to display the original image information of the computer on a monitor display device connected to the connector 51c. Further, it is obvious that the operational mode of the system of FIG. 10 is set to implement any of the foregoing embodiments by setting the switches SW1–SW4 appropriately.

Further, the present invention is not limited to the embodiments described heretofore, but various variations and modifications may be made without departing from the scope of the invention.

What is claimed is:

1. A testing device comprising:
   a computer including a display device, for outputting image information including a synchronization signal;
   reception means for picking up an electromagnetic emission from said computer;
   detection means for detecting said electromagnetic emission and producing an output signal indicative of an image intercepted from said computer;

first connector means connected to said computer, for receiving said synchronization signal from said computer;

transmission means having a first end connected to said first connector means and a second, opposite end, said transmission means transmitting said synchronization signal from said first end to said second end, said transmission means further transmitting said output signal of said detection means to said second end; and second connector means provided on said second end of said transmission means, said second connector means being adapted for connection to a display for supplying said synchronization signal provided by said first connector means and said output signal of said detection means to said display device.

2. A testing device as claimed in claim 1, wherein said first connector means being adapted for receiving an image signal from said computer, and wherein said testing device further includes switching means for selectively supplying one of said output signal of said detection means and said image signal from said computer, to said second connector means.

3. A testing device as claimed in claim 1, wherein said testing device further includes third, different connector means adapted for connection to a second display device, and wherein said transmission means includes a third end connected to said third connector means, said transmission means thereby supplying said synchronization signal at said first end thereof to said third connector.

4. A testing device as claimed in claim 3, wherein said first connection means is adapted for connection to said computer for receiving further an image signal from said computer, and wherein said transmission means transmits said image signal from said computer to said third connection means.

5. A testing device as claimed in claim 1, wherein said reception means comprises a pickup coil that detects said electromagnetic emission of said computer.

6. A testing device as claimed in claim 1, wherein said reception means comprises a high-pass filter circuit and a probe electrode connected thereto for supplying an electric signal, produced in response to said electromagnetic emission of said computer, to said high-pass filter circuit, said probe electrode being adapted for contacting with a part of said computer system.

7. A testing device as claimed in claim 1, further including a variable frequency oscillator for producing a second synchronization signal, wherein said transmission means includes switching means for selectively supplying one of said synchronization signal from said first connector means and said second synchronization signal produced by said variable frequency oscillator, to said third connector means.

8. A testing device as claimed in claim 7, wherein said transmission means further includes a connector for detachably connecting said variable frequency oscillator, such that said second synchronization signal is supplied to said switching means when said variable frequency oscillator is connected to said transmission means.

9. A testing device as claimed in claim 1, wherein said synchronization signal includes a horizontal synchronization signal and a vertical synchronization signal.

10. A testing device comprising:

a probe unit including: reception means for picking up an electromagnetic emission from a computer system; and detection means for detecting said electromagnetic emission and producing an output signal indicative of an image intercepted from said computer system;

a connector unit including: a first connector adapted for connection to a computer that forms a part of said computer system, for receiving a synchronization signal from said computer; a second connector adapted for connection to a display device that forms a part of said computer system, for supplying said synchronization signal to said display device, said second connector being connected to said first connector for supplying said synchronization signal from said first connector to said display device via said second connector; and a third connector connected to said second connector for supplying an image signal from said third connector to said second connector, said second connector thereby supplying said image signal to said display device; and a cable having a first end connector at a first end of said cable for connection to said probe unit for receiving therefrom said output signal of said detection means as an image signal, and a second end connector provided at a second, opposite end of said cable for connection to said third connector, said second end connector supplying said image signal to said third connector such that said image signal is forwarded to said second connector from said third connector in said connector unit, said cable including a signal path for transmitting said image signal from said first end to said second end of said cable; wherein at least one of said first end connector and said second end connector is provided detachably.

11. A testing device as claimed in claim 10, wherein said first connector of said connector unit further receives an image signal from said computer and supplies said image signal to said third connector, wherein said cable includes a second signal path extending from said second end connector to said first end connector for carrying said image signal therethrough, said second end connector of said cable thereby receiving said image signal from said third connector of said connector unit and supplying said image signal to said first end connector through said second signal path, and wherein said probe unit includes a switch for selectively supplying said output signal of said detection means and said image signal supplied from said second signal path, from said first end to said second end of said cable along said first mentioned signal path.

* * * * *